United States Patent Office 3,159,535
Patented Dec. 1, 1964

3,159,535
AEROSOL COMPOSITIONS
Louis M. Sesso and Norman G. Mailander, Racine, Wis., assignors to S. C. Johnson & Son, Inc., Racine, Wis.
No Drawing. Filed Jan. 31, 1962, Ser. No. 170,241
3 Claims. (Cl. 167—39)

This application is concerned with a three-phase, self-propellant composition which may be hermetically sealed in a container having a vapor tap valve with a mechanical outlet and which, on actuation of the valve, produces non-flammable, atomized sprays in which the particles remain airborne for a substantial period of time. More particularly, it is concerned with alcohol free aqueous compositions containing active ingredients which may be sprayed into the atmosphere and function effectively as insecticides, fungicides, bactericides, miticides, insect repellents, space deodorants and comparable products.

Insecticides, space deodorants and similar compositions are often provided in aerosol packages from which they are dispensed by spraying into the atmosphere. It is obvious that maximum effectiveness of the compositions is attained by maintaining the active ingredient airborne as long as possible. Thus, it is apparent that flying insects can best be controlled by insecticides in the atmosphere. Therefore, formulators of compositions of this nature endeavor to produce sprays in which the majority of the particles are of small diameter since the smaller the particle, the longer it will remain suspended in air. As a general rule, the formulators attempt to provide sprays in which 80% of the particles are less than 30 microns in diameter, and none are over 50 microns in diameter. Obviously, sprays which do not exactly conform to this definition may be more or less suitable as space sprays. The definition is only a technical one and does not necessarily define all effective space sprays. It is quite apparent, for example, that a particular insecticide may be so effective that it will control flying insects when dispensed in a spray which does not exactly fit the definition. The definition does, however, represent a practical goal to be obtained. Another definition of aerosols which has been accepted in the art is one in which none of the particles are over 50 microns in diameter.

One method of producing sprays having particles which will remain suspended for the desired period of time is by utilization of a two-phase system. In this system, the composition sealed in the container contains only two phases, the liquid phase and the gaseous phase. The liquid phase comprises the propellant, the active ingredients and solvent. The propellant is a normally gaseous liquid, that is, a substance which is gaseous at standard atmospheric conditions, but liquid under moderate pressure—isobutane and difluoroethane, for example. Mixtures of propellants are often used. The choice of solvent will depend upon the active solute, the type of propellant, and end use of the product. Naturally, the liquid ingredients must be mutually soluble. The gaseous phase comprises, as the major ingredient, vapors of the propellant or propellants and may contain minor amounts of vapors from other ingredients in the liquid phase, for example, kerosene vapors, petroleum ether vapors or naphtha vapors, if these are used as solvents. These vapors make a minor and insignificant contribution to the force which propels the ingredients of the container. This force arises from the vaporization of the propellant which, as pointed out above, is normally gaseous.

For the utilization of these two-phase systems, and in fact for utilization of any self-propellant composition, the container is provided with a suitable valve mechanism for venting the pressurized system to the atmosphere. The valve is usually hand operated and carries a dip tube extending into the liquid phase. In its most simple form, the valve will have two orifices which are open substantially at the same time by moving a suitable button. One orifice opens to the dip tube and the other to the atmosphere. On actuation of the valve, pressure arising from the vaporization of the propellant forces the liquid phase up the dip tube and into the atmosphere. When the propellant reaches the atmosphere, it vaporizes practically instantaneously and with almost explosive force, thus breaking the liquid stream into a large number of small droplets. As would be expected, with this system, the size of the droplets is decreased by increasing the amount of the propellant.

A two-phase system such as that described above has a number of disadvantages. Perhaps the most important of these, in terms of government regulations, is the danger of fire or explosion from venting large amounts of hydrocarbon propellant into the atmosphere, along with flammable active ingredients or solvents therefor. A secondary disadvantage is the necessity of utilizing comparatively large amounts of propellants, and using those which are normally quite expensive if not flammable.

Effective volatilization of the two-phase system can be considerably enhanced by providing a valve with a mechanical break-up outlet. The procedure is well known in the art. It merely involves providing the orifice which vents to the atmosphere, hereinafter called the "exit orifice," with a mechanical obstruction so that the liquid stream coming from the dip tube is broken into a plurality of smaller streams before reaching the atmosphere. The mechanical break-up outlet aids somewhat, but does not completely overcome the disadvantages of the two-phase system referred to above.

An alternative to the two-phase system is the three-phase system in which the composition in the container consists of three phases: a gaseous phase, a liquid propellant phase and an aqueous phase. As with the two-phase system, the gaseous phase comprises vapors of the propellant or propellants as the major component. The liquid propellant phase comprises as the major component a normally gaseous hydrocarbon or halogenated hydrocarbon or mixture of these. The aqueous phase contains the active ingredients and cosolvents, such as alcohol, deemed necessary to dissolve the active ingredients.

In the three-phase system, the propellant may float on top of the aqueous phase or the reverse may occur, depending upon the specific gravity of the two phases. It is undesirable for the propellant to be on the bottom because this necessitates frequent shaking or shortening the dip tube so that it does not extend to the lower liquid phase in order to avoid as much as possible the danger of having only propellant discharged through the valve. This introduces economic problems since, with a shortened dip tube, it is not possible to discharge all of the active ingredients. It is apparent, therefore, that in the ideal three-phase system, the propellant will be the upper layer.

The three-phase system above described is normally not capable of producing fine sprays. This is because when the system is functioning correctly, only the aqueous phase is forced up the dip tube and into the atmosphere. Hence, there is no explosive force from the rapid vaporization of the propellant and the aqueous phase is emitted as a fine stream rather than as a spray.

Two methods are available for alleviating this situation; one is shaking, the other is the use of a vapor tap valve. The former expedient is far from satisfactory. By shaking, the two liquid phases are mixed so that some propellant is forced out of the dip tube. However, since the liquids are immiscible they quickly separate and the system reverts to its former state. The vapor tap valve is more satisfactory especially when utilized in conjunction with a mechanical break-up outlet.

The vapor tap valve is well known in the art. Essentially, it is formed by adding to the standard valve a mixing chamber interposed between the dip tube and the exit orifice. The mixing chamber is provided with an orifice leading to the vapor phase. Thus, when the vapor tap valve is actuated, some of the vapors from the gaseous phase enter the mixing chamber where they mix with the liquid in the dip tube and the mixture is vented through the exit orifice. It will be described more fully below.

The combination of the vapor tap valve and mechanical break-up outlet, coupled with shaking, markedly decreases the size of the spray droplets. It does not, however, completely solve the problem.

One of the difficulties is that since some propellant is vented into the mixing chamber, it is necessary to control carefully the amount of propellant so that there is always enough to perform the major function, that is, the forcing of the aqueous spray up the dip tube. The problem is even more acute if a mixture of propellants is used. Obviously, the more volatile constituent will be selectively bled into the mixing chamber so that with continued use the relative proportion of the two propellants will vary. Furthermore, mechanical mixing of the propellant vapor and the liquid phase in the mixing chamber of the vapor tap valve will not always accomplish the desired result. This is especially true with the more viscous liquids since these require large amounts of propellant to effect atomization. It is apparent that atomization is best effected by expelling some liquid propellant with the aqueous phase. This can be accomplished, as the art has recognized, by the use of emulsions.

There are two types of emulsions generally used with three-phase systems. One is an oil in water emulsion in which the oil phase is dispersed in a continuous water phase. The other is a water in oil emulsion in which the water phase is dispersed in a continuous oil phase. These systems are referred to as water-out emulsions and oil-out emulsions respectively. Both the aqueous phase and the oil phase may, of course, contain other ingredients. The water phase, for example, may contain the active ingredients, any cosolvents deemed necessary and one or more emulsifiers. Portions of these ingredients may also be in the propellant phase, the specific amount depending on the distribution coefficient.

Water-out emulsions may be viewed as compositions in which the oil, that is, the propellant is dispersed in a soap solution formed by the emulsifier and the aqueous phase. When these emulsions are vented to the atmosphere, the rapidly expanding propellant becomes trapped in the soap solution in the form of a multitude of bubbles. The result is a foam and while foams are acceptable, indeed desirable for some uses, for example, shaving creams or shampoos, they are obviously completely unacceptable for space sprays. With oil-out emulsions on the other hand, the propellant is the external phase and is not trapped, and upon vaporization it "explodes" the internal aqueous phase into an atomized spray.

For the best results in the production of space sprays it is preferred to use an oil-out mulsion and a vapor tap valve having a mechanical break-up outlet. The propellant phase, that is, that portion of it which is not emulsified, should float on top of the aqueous phase. It must, therefore, have a lower specific gravity than the aqueous phase. These facts have long been recognized in the art and a number of formulations of this type have been described and utilized. These formulations, however, have always included alcohol as a cosolvent in the aqueous phase. Alcohol has been included because it was believed necessary to solubility of the various ingredients in the aqueous phase. It was also believed to contribute to the production of small particles by decreasing the surface tension of the aqueous phase, thus limiting the amount of propellant necessary to atomize the aqueous phase. It was also believed to contribute to the ease of atomization because it is itself more volatile than water.

There were, however, recognized disadvantages to the use of alcohol. The use increased the flammability of the spray. Naturally it also increased the cost. Another serious disadvantage is that alcohol is known for its ability to break emulsions. This property manifests itself in space sprays by the production of coarse particles or droplets which will not remain suspended in the air, but tend to drop out quite rapidly. It has now unexpectedly been discovered that space sprays which are entirely suitable as space deodorants, insecticides for flying insects and other uses where the active ingredient must remain airborne for maximum effectiveness, can be prepared using oil-out emulsions without the use of alcohol. This application is concerned with these oil-out emulsions, with the hermetically sealed packages containing them and with a method of spraying which utilizes them.

Accordingly, the application is concerned with a three-phase, self-propellant composition consisting of an upper phase, a middle liquid propellant phase, and a lower aqueous phase. The middle propellant phase is a normally gaseous liquid propellant of the class usually employed with compositions of this nature, that is, it is a low boiling, hydrocarbon or halogenated hydrocarbon. Mixtures of these compounds can also be employed. The gaseous phase, of course, is the vapors of the propellant or propellants although minor amounts of other volatile vapors may be present. The lower aqueous phase is alcohol free, consisting essentially of water, a sufficient amount of emulsifier to form an oil-out emulsion and at least one active ingredient. Alcohol, as used herein, is used generically to include methanol, ethanol, propanol, isopropanol and other lower members of the homologous series of alcohols which have heretofore been used in the pressurized packaging art.

Anionic, cationic and non-ionic emulsifiers can be successfully utilized in the practice of this invention. The only requirement is that the emulsifier produce an oil-out emulsion. As is well known, certain emulsifiers will produce oil-out emulsions in one environment and water-out emulsions in another. Thus an emulsifier which with a specific propellant and insecticide in the aqueous phase will produce an oil-out emulsion, will produce a water-out emulsion if the insecticide or propellant is changed. The applicability of a specific emulsifier may, however, be readily tested in accordance with known procedures. For example, the addition of more propellant to an emulsion in which the propellant is in the continuous phase will decrease the viscosity of the composition. The addition of water will increase the viscosity. The opposite effect will be observed if water is the continuous phase, that is, if the emulsion is a water-out emulsion. The presssence or absence of an oil-out emulsion can also be determined by testing the capacity of the composition to conduct a current. Oil-out emulsions, as is well known, do not conduct electricity.

Emulsifiers which form oil-out emulsions have a number of properties in common. They manifest very low solubility in water and good solubility in non-polar solvents at room temperature. Emulsifiers which have been found especially suitable for the practice of this invention are long chain, fatty acid esters of polyhydroxylic compounds, such as the glycol, glycerol and sorbitol esters of oleic, stearic, palmitic and lauric acids. Ethoxylated fatty acids and amides are also useful. Ethoxylated stearic acid containing 5 molecules of ethylene oxide has been found to be especially useful in the preparation of space deodorants within the scope of this invention. This compound is available under the trade name Ethofat 60/15 from Armour & Company. Similar compounds having fewer than 5 ethylene oxide moieties are also useful. However, similar compounds in which the proportion of ethylene oxide is increased are too water soluble to be effective.

A partial list of suitable emulsifiers is shown in the following table in which the emulsifier is listed by trademark, chemical constitution and company from which it is available. Other emulsifiers have also been tested and found applicable.

| Trademark | Chemical Name | Company |
|---|---|---|
| Emcol 14 | Polyglycerol oleate | Emulsol Chemical Corp. |
| Emcol RGB | Propylene glycol stearate | Do. |
| Emcol NSB | Glycerol monostearate | Do. |
| Span 20 | Sorbitan monolaurate | Atlas Powder Company. |
| Span 40 | Sorbitan monopalmitate | Do. |
| Span 80 | Sorbitan mono-oleate | Do. |
| Siponic E-2 | Ethoxylated stearyl cetyl alcohol | American Alcolac Corp. |

It is possible, although not essential, to use mixtures of emulsifiers and this sometimes leads to emulsions of increased stability.

Often the use of auxiliary emulsifiers will result in increased ease of handling of the composition during the manufacturing process. For example, it may be desirable to form an initial emulsion of one of the ingredients such as the perfume in water using one emulsifier and then to add another emulsifier before adding the balance of the ingredients in the composition. The amount of emulsifier present in the final composition is not critical. It is only necessary that a sufficient amount be present to produce an oil-out emulsion. Usually from about 0.5% to about 2.0% by weight is adequate. With specific highly efficient emulsifiers, smaller amounts may be used and occasionally unusual formulation problems may require more than the preferred amount of emulsifying ingredient or ingredients.

Other substances which may be present in the aqueous phase include, for example, perfumes, insecticides, fungicides, miticides and insect repellents. These ingredients, which may be used alone but are often combined, may be generally classed as active ingredients. Typical insecticides include pyrethrins and their synergists, chlordane, lindane, dieldrin, allethrin and others. Certain of these also function as miticides. Because of unpleasant odors, it is often desirable to mask insecticides with perfumes. Perfumes include a large class of chemical mixtures and compounds which excite a pleasing sensation on contact with the olefactory receptors. These include acids, alcohols, esters, acetals, ketones, ethers, phenols, amines and others. The selection of a particular perfume or mixture of perfumes for use in a composition of this invention will depend upon the effect which it is desired to achieve. Any of a large number of perfumes and mixtures thereof may be successfully employed. Among the insect repellents which may be successfully utilized in this invention, N,N-dimethyl-m-toluamide may be mentioned by way of example. As aforementioned, the identity of particular active ingredients will depend upon the intended use of the finished product as, of course, will the amount of each active ingredient.

Other minor ingredients may be present in the formulations of this invention, but they are not essential to the invention. Thickening agents, such as Maran-D, a partially saponified resin acid derived from colophonium may be added to prevent too rapid escape of the propellant from the vapor tap. Diethyl phthalate may be added to extend the perfume. As stated above, synergists may be added to enhance the insecticidal activity of the pyrethrins. Occasionally it will be desirable to use deionized water to obtain maximum effects, but this is not essential. Antifoam agents may sometimes be used to make it possible to utilize emulsifying agents having somewhat increased solubility in water. It is emphasized, however, that the aqueous phase, and in fact the total composition of this invention, is alcohol free.

The propellants used in the practice of this invention are the normal propellants ordinarily utilized in the manufacture of aerosol compositions. They include hydrocarbon and halogenated hydrocarbon propellants such as propane, butane, isobutane, isopentane, dichlorodifluoromethane, difluoroethane and tetrafluoroethane. Most halogenated hydrocarbons have a specific gravity which is higher than water. In the practice of this invention these propellants will be diluted with unsubstituted hydrocarbons to obtain a propellant layer which floats on top of the aqueous layer. Even with a halogenated hydrocarbon, such as difluoroethane which is less dense than water but exerts an especially high vapor pressure, it is sometimes desirable to dilute with an unsubstituted hydrocarbon so as to obtain a propellant mixture which does not lose its effectiveness by loss of propellant through the vapor tap. Mixtures of propellants will often be employed to decrease the vapor pressure within the container to safe limits. Some halogenated propellants exert such a high pressure that safety becomes a problem especially at high ambient temperatures.

The amount of propellant used will depend upon a number of factors, as is well known. With a fairly viscous aqueous phase or when the valve orifices are unusually large, a greater amount of propellant will be employed than with less viscous aqueous phases and smaller orifices. It is, of course, desirable to utilize sufficient propellant to spray all of the aqueous phase containing the active ingredient bearing in mind that some of the propellant will be lost through the vapor tap. Generally speaking, the propellant will amount to from about 25% to about 60% by weight of the total composition. The amount is not critical and will vary with the amount and properties of the other ingredients in the composition. Smaller amounts may be employed with aqueous compositions of low viscosity and this may contribute to lowering the cost of the total composition. Alternatively, with viscous compositions or if it is desired to eject fairly large amounts of propellant to assure the attainment of very small droplets, larger amounts of propellant may be used. However, the propellant contributes significantly to the cost of the composition and it is generally preferred to use the minimum amount which can be effectively utilized. In preferred formulations from about 30% to about 40% by weight of propellant based on the weight of the total composition will be used.

The practice of this invention contemplates the use of a vapor tap valve with a mechanical break-up outlet. Both of these are standard and well known in the art. The valve which is sealed in the container to produce a closed system comprising a premixing chamber and a secondary mixing chamber. The premixing chamber has two orifices. The first is a body orifice in cooperative engagement with a dip tube so that the emulsified liquid coming up the dip tube passes through the orifice and into the mixing chamber. The second is a vapor tap orifice communicating with the vapor phase of the system so that propellant vapor passes into the premixing chamber where it mixes with the liquid from the dip tube. The mixture thus produced passes then into the secondary mixing chamber. The secondary mixing chamber has two orifices, a stem orifice and an exit orifice. The stem orifice communicates with the premixing chamber so that mixed liquid and propellant vapors pass readily into it. The exit orifice communicates with the atmosphere and is constructed with a mechanical obstruction so that the mixture coming from the secondary mixing chamber is broken up into a plurality of streams. An exist orifice having a mechanical obstruction is referred to herein as a mechanical break-up outlet.

Referring now to the size of the various orifices, the body orifice may be from about 0.02 to about 0.100 inch in diameter. The stem orifice is from about 0.01 to about 0.03 inch in diameter. The vapor tap orifice is from about 0.01 to about 0.03 inch in diameter and the mechanical break-up outlet is from about 0.012 to about 0.025 inch in diameter.

Obviously, a fair amount of latitude is possible in the valving of a container of this invention, but some generalizations may be made. The body orifice is generally equal to or larger in size than the stem orifice and generally larger than the vapor tap orifice. The mechanical break-up outlet is always smaller than the body orifice. An especially useful valving system is one in which the body and stem orifices are both 0.025 inch in diameter, the vapor tap orifice 0.013 inch in diameter, and the mechanical break-up outlet 0.016 inch in diameter. This preferred valve assembly produces excellent results with respect to size of the droplets in the spray.

The three-phase hermetically sealed self-propellant oil-out emulsions of this invention are alcohol free and when sprayed through a vapor tap valve having a mechanical break-up outlet produce non-flammable aerosol sprays in which substantially all of the component particles remain airborne for an extended period of time, that is, for a sufficient length of time to efficiently accomplish the desired effect. Furthermore, since fairly stable emulsions are produced, aerosol sprays, that is, sprays consisting of extremely small droplets which will remain dispersed in the atmposphere continue to be produced even if spraying is continued several minutes after the original shaking. This is an extremely important feature of this invention. Many prior art attempts at space sprays have produced sprays in which fine particles exist only during the first few seconds of the spraying. The spray then reverts to one containing a large number of non-aerosol particles which, because of their extreme size, settle almost immediately. The difference can be readily appreciated by spraying in front of a light source. It will be seen that sprays produced using a composition of this invention appear to float in the air and that this appearance persists even though spraying is continued for up to five minutes or even more. However, with prior art sprays, even though there may be an initial surge of spray in which the particles have the same properties as the sprays of this invention, the sprays quickly revert to the non-aerosol type in which many of the particles start to settle immediately. It is believed that a major factor contributing to the inadequacy of the prior art space sprays is the presence of alcohol in the aqueous phase. Because of the alcohol, any emulsion which is formed when the container is shaken prior to actuation of the valve breaks up almost immediately with the result that only limited amounts of propellant are ejected with the aqueous phase and the explosive force necessary to produce and to continue to produce particles of a size to remain airborne is not present. The emulsions of this invention, even though similar to prior art emulsions in all respects except for the absence of alcohol, are sufficiently stable so that propellant is dispensed through the eductor tube as well as the vapor tap to produce airborne particles during spray cycles of long duration.

The sprays of this invention, despite the presence of large amounts of propellant, are non-flammable when tested in accordance with standard methods. They may, for example, be sprayed into an open 55 gallon drum in which there is a burning taper without evidence of flame propagation. There is no explosion when the drum is closed. The absence of alcohol contributes markedly to this effect. Another factor to be considered in the matter of flammability is the rate of discharge. Compositions exemplified herein produce discharge rates of less than 0.6 gram per second. Higher rates may sometimes produce positive drum tests, depending upon the nature of the propellant system. The only minimum rate of discharge for the compositions of this invention is dictated by the practical consideration of dispensing sufficient active material to accomplish the intended purpose in the time which a person normally actuates a pressure package. For example, if the average person depresses the operator button for a period of about 10 seconds, there must obviously be sufficient toxicant or perfume dispensed in that period to kill the insect or mask the odor.

The following examples are given by way of illustration only and are not intended as limitations of this invention, many apparent variations of which are possible without departing from the spirit and scope thereof.

EXAMPLE I

*Insecticides*

A

| | | |
|---|---|---|
| Pyrethrins | percent | 0.20 |
| Piperonyl butoxide | do | 1.00 |
| N-octyl bicycloheptene carboximide | do | 1.00 |
| Fragrance | do | 0.20 |
| Sorbitan mono-oleate | do | 0.25 |
| Ethofat 60/15 | do | 0.67 |
| Deionized water | do | 59.83 |
| Petroleum distillate | do | 0.85 |
| Isobutane | do | 32.00 |
| Dichlorodifluoromethane | do | 4.00 |
| Valving: | | |
| Body orifice | inches | 0.025 |
| Stem orifice | do | 0.025 |
| Vapor orifice | do | 0.013 |
| Mechanical outlet | do | 0.016 |

B

| | | |
|---|---|---|
| Pyrethrins | percent | 0.25 |
| Piperonyl butoxide | do | 1.25 |
| Fragrance | do | 0.20 |
| Sorbitan mono-oleate | do | 0.25 |
| Ethofat 60/15 | do | 0.67 |
| Deionized water | do | 60.35 |
| Petroleum distillate | do | 1.03 |
| Isobutane | do | 32.00 |
| Dichlorodifluoromethane | do | 4.00 |
| Valving: | | |
| Body orifice | inches | 0.025 |
| Stem orifice | do | 0.025 |
| Vapor orifice | do | 0.013 |
| Mechanical outlet | do | 0.016 |

C

| | | |
|---|---|---|
| Base: | | |
| Insecticide | percent | 50.00 |
| Pyrethrins | percent | 10 |
| Piperonyl butoxide | do | 50 |
| Petroleum distillate | do | 40 |
| N-octyl bicycloheptene dicarboximide | percent | 25.00 |
| Fragrance | do | 2.52 |
| Sorbitan mono-oleate | do | 5.97 |
| Ethofat 60/15 | do | 16.51 |
| Final product: | | |
| Base | do | 4.00 |
| Deionized water | do | 60.00 |
| Isobutane | do | 32.00 |
| Dichlorodifluoromethane | do | 4.00 |
| Valving: | | |
| Body orifice | inches | 0.025 |
| Stem orifice | do | 0.025 |
| Vapor orifice | do | 0.013 |
| Mechanical outlet | do | 0.016 |

D

| | | |
|---|---|---|
| Lindane | percent | 2.00 |
| Fragrance | do | 0.30 |
| Siponic E-2 | do | 2.00 |
| Water | do | 35.70 |
| Isobutane | do | 50.00 |
| Dichlorodifluoromethane | do | 10.00 |

EXAMPLE I—Continued

Valving:
- Body orifice _____ inches__ 0.02
- Stem orifice _____ do____ 0.01
- Vapor tap _____ do____ 0.01
- Mechanical outlet _____ do____ 0.012

E

- Insecticide _____ percent__ 2.50
  - Allethrin _____ percent__ 10
  - Piperonyl butoxide _____ do____ 40
  - Petroleum distillate _____ do____ 50
- Fragrance _____ percent__ 1.00
- Sorbitan mono-oleate _____ do____ 0.25
- Ethofat 60/15 _____ do____ 0.25
- Water _____ do____ 56.00
- Isobutane _____ do____ 37.00
- Dichlorodifluoromethane _____ do____ 3.00

Valving:
- Body orifice _____ inches__ 0.08
- Stem orifice _____ do____ 0.03
- Vapor tap _____ do____ 0.03
- Mechanical outlet _____ do____ 0.025

F

Base:
- Insecticide _____ percent__ 3.15
  - Pyrethrins _____ percent__ 12.0
  - Piperonyl butoxide _____ do____ 38.4
  - Petroleum distillate _____ do____ 49.6
- Sorbitan mono-oleate _____ percent__ 0.50
- Fragrance _____ do____ 0.10
- Ethofat 60/15 _____ do____ 1.50
- Antifoam A _____ do____ 0.20
- Deionized water _____ do____ 94.73

Final product:
- Base _____ do____ 65.00
- Isobutane _____ do____ 28.00
- Dichlorodifluoromethane _____ do____ 7.00

Valving:
- Body orifice _____ inches__ 0.030
- Stem orifice _____ do____ 0.030
- Vapor tap _____ do____ 0.030
- Mechanical outlet _____ do____ 0.020

All of the above products yielded aerosol sprays in which the droplets remained airborne for a considerable period of time. When tested against house flies in accordance with the standard Peet-Grady procedure, knockdowns as high as 70% or even higher were observed at the end of fifteen minutes. Twenty-four hour mortalities of 70% or more were recorded. The sprays were non-flammable.

EXAMPLE II

Space Deodorants

A

Base:
- Perfume _____ percent__ 0.9
- Ethofat 60/15 _____ do____ 1.5
- Diglycol laurate, neutral _____ do____ 0.6
- Diethyl phthalate _____ do____ 1.25
- Water _____ do____ 95.75

Final product:
- Base _____ do____ 65.00
- Isobutane _____ do____ 28.00
- Dichlorodifluoromethane _____ do____ 7.00

Valving:
- Body orifice _____ inches__ 0.030
- Stem orifice _____ do____ 0.030
- Vapor tap _____ do____ 0.025
- Mechanical outlet _____ do____ 0.020

B

Base:
- Perfume _____ percent__ 0.9
- Sorbitan mono-oleate _____ do____ 1.5
- Diethyl phthalate _____ do____ 1.25
- Diglycol laurate, neutral _____ do____ 0.6
- Water _____ do____ 95.75

Final product:
- Base _____ do____ 65.00
- Isobutane _____ do____ 28.00
- Dichlorodifluoromethane _____ do____ 7.00

Valving:
- Body orifice _____ inches__ 0.030
- Stem orifice _____ do____ 0.030
- Vapor tap _____ do____ 0.025
- Mechanical outlet _____ do____ 0.020

C

Base:
- Perfume _____ percent__ 1.5
- Emcol 14 _____ do____ 2.0
- Water _____ do____ 96.5

Final product:
- Base _____ do____ 75
- n-Butane _____ do____ 25

Valving:
- Body orifice _____ inches__ 0.030
- Stem orifice _____ do____ 0.030
- Vapor tap _____ do____ 0.025
- Mechanical outlet _____ do____ 0.020

The above products and other similar ones are effective space deodorants. The sprays are non-flammable and an effective amount of the perfume remains airborne so that its effects can be felt for a considerable period of time.

Products similar to the insecticides and space deodorants whose formulas are given above are prepared and utilized as miticides, bactericides, insect repellents, etc. by replacing the insecticides and perfumes with suitable active ingredients.

What is claimed is:

1. A pressurized, self-propellant composition consisting essentially of:
   a stable oil-out emulsion,
   liquid propellant having a specific gravity less than said emulsion and,
   gaseous propellant provided by volatilization of said liquid propellant;
   wherein a portion of said liquid propellant comprises the continuous phase of said stable oil-out emulsion, said stable oil-out emulsion consists essentially of water, active ingredients, emulsifier and said liquid propellant, the aqueous phase of said stable oil-out emulsion is readily dispersible throughout said self-propellant composition, and said liquid propellant is a normally gaseous propellant selected from the group consisting of hydrocarbons and halogenated hydrocarbon propellants and mixtures thereof.

2. A pressurized self-propellant composition according to claim 1 wherein said liquid propellant is diluted with an unsubstituted hydrocarbon.

3. A pressurized, self-propellant composition consisting essentially of:
   a stable oil-out emulsion,
   liquid propellant having a specific gravity less than said emulsion and,
   gaseous propellant provided by volatilization of said liquid propellant;
   wherein a portion of said liquid propellant comprises the continuous phase of said stable oil-out emulsion, said stable oil-out emulsion consists essentially of water, active ingredients, emulsifier and said liquid propellant, the aqueous phase of said stable oil-out emulsion is readily dispersible throughout said self-propellant composition, and said liquid propellant is a normally gaseous propellant selected from the group consisting of hydrocarbons and halogenated hydrocarbon propellants and mixtures thereof, and wherein water comprises from about 35 to about 75 percent by weight of the composition; said propellant comprises from about 25 to about 60 percent by weight of the composition, active ingredients comprise from about 0.1 to about 5.0 percent by weight of the composition and emulsifier comprises from about 0.3 to about 3.0 percent by weight of the composition.

References Cited in the file of this patent

UNITED STATES PATENTS

| | | |
|---|---|---|
| 2,524,590 | Boe | Oct. 3, 1950 |
| 2,705,661 | Meissner | Apr. 5, 1955 |
| 2,728,495 | Eaton | Dec. 27, 1955 |
| 2,968,628 | Reed | Jan. 17, 1961 |
| 2,995,278 | Clapp | Aug. 8, 1961 |

FOREIGN PATENTS

| | | |
|---|---|---|
| 717,460 | Great Britain | Oct. 27, 1954 |
| 732,692 | Great Britain | June 29, 1955 |

OTHER REFERENCES

Herzka et al.: "Pressurized Packaging (Aerosol)," published by Butterworths Scientific Publications, London, 1958, pp. 12–16 and 189–201.